United States Patent [19]
Wolber et al.

[11] Patent Number: 5,261,043
[45] Date of Patent: Nov. 9, 1993

[54] INPUT AND OUTPUT DATA CONSTRAINTS ON ICONIC DEVICES IN AN ICONIC PROGRAMMING SYSTEM

[75] Inventors: Susan G. Wolber, Ft. Collins; Douglas C. Beethe, Loveland, both of Colo.

[73] Assignee: Hewlett-Packard Company, Palo Alto, Calif.

[21] Appl. No.: 668,286

[22] Filed: Mar. 12, 1991

[51] Int. Cl.$^5$ ............................................. G06F 15/60
[52] U.S. Cl. ................................................... 395/159
[58] Field of Search ................ 340/713, 710; 395/154, 395/155-161, 140, 700; 364/488-490

[56] References Cited

U.S. PATENT DOCUMENTS

| | | | |
|---|---|---|---|
| 4,315,315 | 2/1982 | Kossiakoff | 395/140 |
| 4,455,619 | 6/1984 | Masui et al. | 395/160 |
| 4,546,435 | 10/1985 | Herbert et al. | 395/700 |
| 4,812,996 | 3/1989 | Stubbs | 395/156 X |
| 4,813,013 | 3/1989 | Dunn | 395/159 |
| 4,901,221 | 2/1990 | Kodosky et al. | 395/159 |
| 4,914,568 | 4/1990 | Kodosky et al. | 395/275 |
| 4,956,773 | 9/1990 | Saito et al. | 395/159 |
| 4,984,152 | 1/1991 | Muller | 395/159 X |
| 5,025,395 | 6/1991 | Nose et al. | 395/154 |
| 5,040,131 | 8/1991 | Torres | 395/156 |

OTHER PUBLICATIONS

"Labview Upgrade Reduces Execution Time and Enhances Editing and Graphics Controls", EDN, Sep. 15, 1988, p. 134.
*An Instrument That Isn't Really*, Michael Santori, IEEE Spectrum, Aug. 1990, pp. 36–39.
*Labview: Laboratory Virtual Instrument Engineering Workbench*, G. Vose and G. Williams, BYTE Magazine, Sep. 1986, pp. 84–92.
*Programming With Pictures*, Jeff Kodosky and Bob Dye, Computer Language Magazine, Jan. 1989, pp. 61–69.
Labview Product Description, National Instruments Corp., Austin, Tex., 1987.

*Primary Examiner*—Gary V. Harkcom
*Assistant Examiner*—John E. Breene

[57] ABSTRACT

A system that allows a user of an iconic programming system to specify data input constraints on any terminal of any icon of an iconic network program defined within the system. When adding connecting lines between icons during program creation, the iconic programming system verifies that any input constraints defined for an input terminal match the data type and shape of the data being sent by an output terminal. If a mismatch occurs, the system will allow a connection only if a method is available for converting the type and shape of the data. During the execution of the iconic network program, the constraints for each input terminal are compared to the type and shape of data being received on the terminal. Processing will continue only if the constraints match or the data can be converted.

8 Claims, 9 Drawing Sheets

FIG. 1

PRIOR ART

INPUT AND OUTPUT DATA CONSTRAINTS ON ICONIC DEVICES IN AN ICONIC PROGRAMMING SYSTEM

CROSS REFERENCE TO RELATED APPLICATIONS

This application is related to application Ser. No. 07/483,478 filed Feb. 22, 1990 for PROGRAMMING ESCAPE FROM AN ICONIC SYSTEM of Bailey, Beethe, Wolber, and Williams; application Ser. No. 07/537,550 filed Jun. 13, 1990 for PROCESSING METHOD FOR AN ICONIC PROGRAMMING SYSTEM, of Beethe; and application Ser. No. 07/661,936 filed Feb. 28, 1991 for LINE PROBE IN AN ICONIC PROGRAMMING SYSTEM of Wolber; all assigned to the same entity.

FIELD OF THE INVENTION

This invention relates to computer systems and more particularly to Iconic Programming Systems. Even more particularly, the invention relates to constraining data acceptable for input by an icon within an iconic programming system.

BACKGROUND OF THE INVENTION

An iconic programming system is a "programmingless" environment where programming is done by connecting graphical images of devices (icons), together with connecting lines, to create an iconic network which represents a software program or simulation model. The iconic programming system may be used in research and development test environments, where several different electronic devices are connected to test a system or device. Programming such a system requires instructions to cause the various devices to perform desired functions in order to operate as a system.

Figure 2:
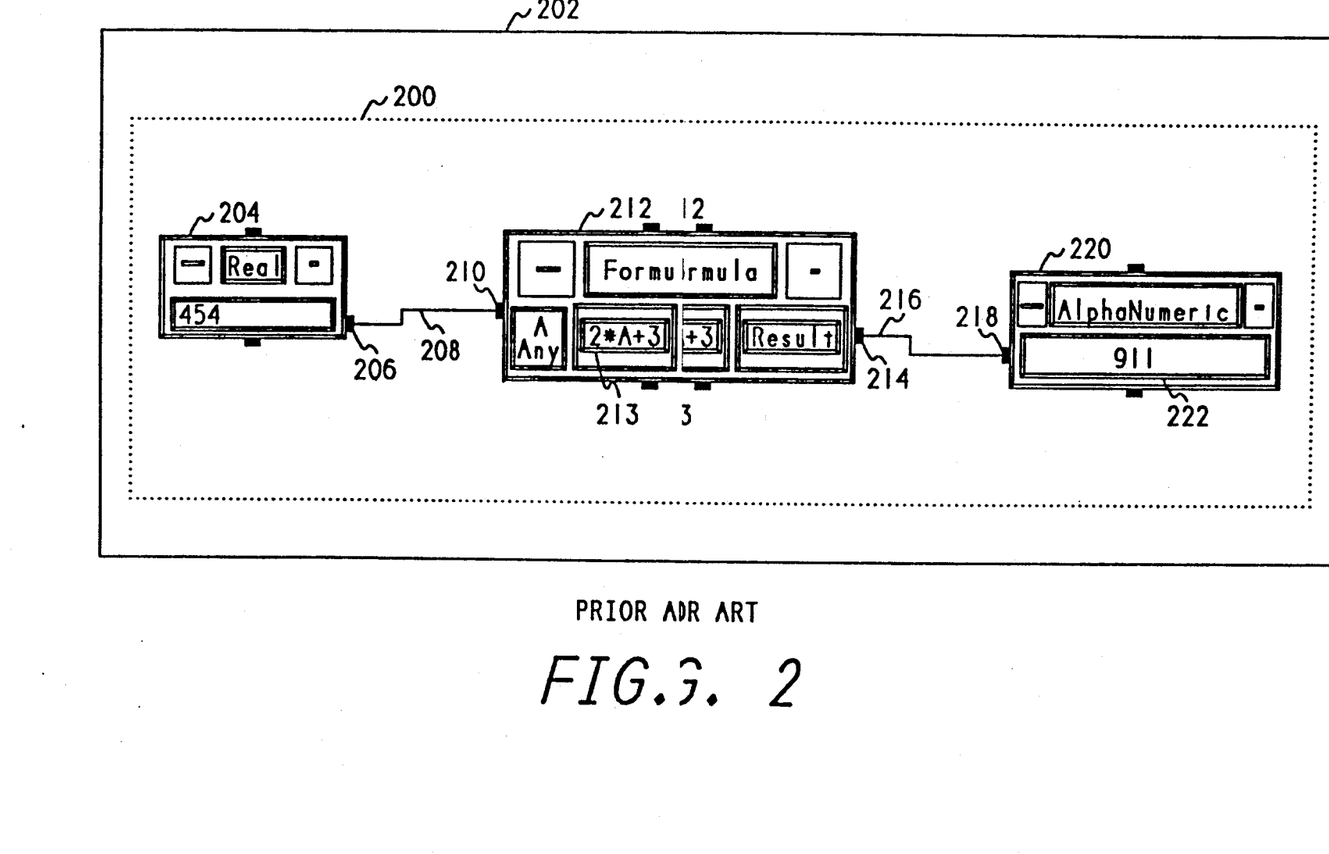
FIG. 2 shows a prior art iconic network suitable for use with the present invention.

When an iconic programming system is used, each device is represented by a graphical icon, also called a graphical object, and the connections between the devices are represented by connecting lines between the graphical icon images. Each device may have multiple lines connecting from other devices, bringing data into the device for it to use during its execution. Each device may also have multiple output lines connecting to other devices, to pass its new or changed data on to the other devices in the program. In addition to graphical icons representing devices in such a system, graphical icons are provided for programming functions, for example looping, IF-THEN statements, etc. By combining device and programming icons, a user can create an iconic network involving the programmed operation of several devices. An example of a simple iconic network is shown in FIG. 2, described below.

When the program runs, each device executes in turn, and during its execution, each device may use the data on its input lines, modify it, and put the same or other data on its output lines for other devices to use.

When data is passed along a connecting line from one icon to another, it will have a specific form. For example, data may be a single dimensioned array of integers, or it may be a real scalar, etc. Some terminals of some icons can take data in only one form. Prior art iconic systems do not provide a way for a programmer to control the form of the data received by an icon. If an icon receives data of an incorrect form, it is unable to process the data and processing of the entire system must stop.

There is a need in the art then for a system that will provide a way for a programmer in an iconic system to restrict the form of data acceptable to an icon. There is further need for such a system to identify a connection error when a connection is being made between icons. There is a further need for such a system that will automatically convert incorrect data, if such a conversion is possible. The present invention meets these needs.

Various features and components of an iconic network system are disclosed in U.S. patent applications:
(A) Application Ser. No. 07/483,478 filed Feb. 22, 1990 for PROGRAMMING ESCAPE FROM AN ICONIC SYSTEM of Bailey, Beethe, Wolber, and Williams;
(B) Application Ser. No. 07/537,550 filed Jun. 13, 1990 for PROCESSING METHOD FOR AN ICONIC PROGRAMMING SYSTEM of Beethe;
(C) Application Ser. No. 07/661,936 filed Feb. 28, 1991 for LINE PROBE IN AN ICONIC PROGRAMMING SYSTEM of Wolber;
each of which is hereby specifically incorporated by reference for all that is disclosed therein.

SUMMARY OF THE INVENTION

It is an aspect of the present invention to provide a system that constrains the form, such as type, shape, size or limits, of data passed between icons of an iconic network.

It is another aspect of the invention to check such constraints when a connecting line is established between the icons.

Another aspect is to check such constraints during the processing of the iconic network program.

Yet another aspect of the present invention is to provide methods to automatically convert data to an acceptable type and shape whenever such conversion is possible.

A further aspect of the present invention is to prevent an operator of such system from changing the constraints.

The above and other aspects of the invention are accomplished in a system that allows a user of the iconic programming to specify data input constraints on any terminal of any icon within the iconic network. When creating the system, the user selects an input terminal and requests a dialog box from the system. The dialog box displays the constraints, if any, currently in force, and allows the user to add or change these constraints.

When adding connecting lines between icons, the iconic programming system obtains information about any input constraints defined for the input terminal connected to the line and verifies that these constraints match the data type and shape of the data being sent by the output terminal. If a mismatch occurs, the system will try to provide a method for converting the type and shape of the data, and if such conversion is possible, the system will allow the connection. If a mismatch occurs, and the data cannot be converted, the system displays an error message, and prevents the connection.

When each icon of the network is being processed during the execution of the iconic network program, the constraints for each input terminal are compared to the data type and shape being received on the terminal. If a mismatch occurs, the system attempts to convert the input data to a matching type and shape, but will discontinue processing if an unconvertible mismatch occurs.

The system is also able to lock the constraints placed within the system. This prevents an operator of the system from changing the constraints.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
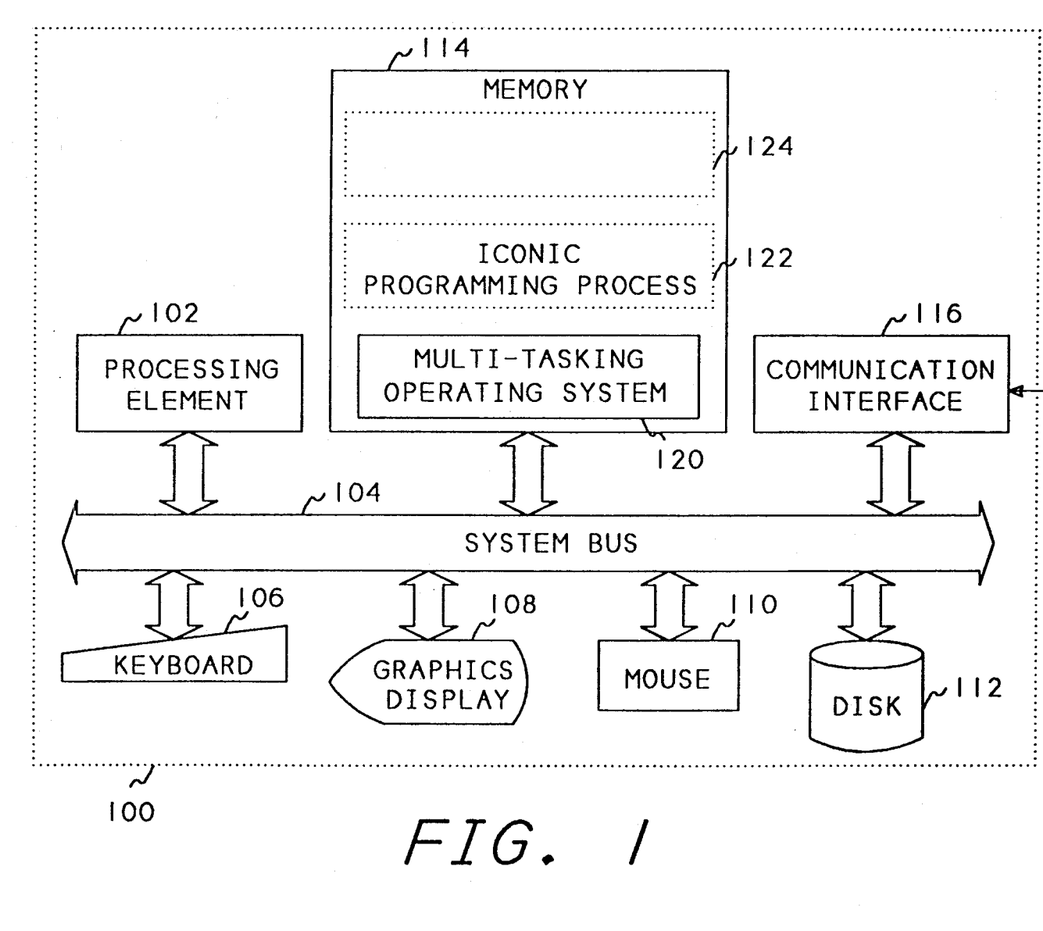
FIG. 1 shows a block diagram of a computer system incorporating the present invention.

FIG. 1 shows a block diagram of a computer system incorporating the present invention. Referring now to FIG. 1, a computer system 100 contains a processing element 102 which connects to the other components of the system through a system bus 104. A keyboard 106 allows a user to input textual data to the system, and a mouse or pointing device 110 allows a user to input graphical data to the system. A graphics display 108 allows the system to output text and graphical information to the user. A disk 112 is used by the system to store the software of the iconic programming system environment, as well as the user-defined iconic network. A communications interface 116 is used to create a communications network which allows the computer and iconic programming environment to communicate with other computers, instruments, and other environments. A multi-tasking operating system 120 can have a plurality of tasks, also called processes, here illustrated by task 122 and task 124. Task 122 is shown containing the iconic programming process including the data constraint system of the present invention.

FIG. 2 shows a simple prior art iconic network program that will be used to illustrate the data constraint system of the present invention. This simple iconic network is for illustration purposes only. The system of the present invention can be used with any iconic network, however complicated that network might be. Referring now to FIG. 2, an iconic network 200 is shown displayed on a graphical display 202. The graphical display 202 represents the output of the graphics display 108 (FIG. 1). The iconic network 200 contains an icon 204 which is used to input a real number into an iconic network program. In the example icon 204, the real number being input is the number 454. The real number is output by the icon 204 via an output terminal 206. The output terminal 206 is connected to an input terminal 210 of a formula icon 212. The connection between the output terminal 206 of icon 204 and the input terminal 210 of icon 212 is made with a connecting line 208.

The formula icon 212 will process data received on the input 210 using a formula shown in the box 213. In this example, the formula multiplies the input terminal data by 2 and adds 3 to the result. This is by way of example only since any arbitrary formula, however complex, could be used in the formula icon 212. The number arrived at by applying the formula in the box 213 to the input data 210 is placed on the output 214, which is named the "result". The output 214 is connected by a connecting line 216 to an input terminal 218 of an alphanumeric display icon 220. The alphanumeric display icon 220 displays the input that it receives on input 218 in a box 222.

The data constraint system of the present invention can dynamically display and allow a user to alter the data on any of the input terminals of any of the icons. For example, the system could be used to display data on input terminal 210 or input terminal 218. As will be described below, the user of the system may choose any of these terminals to display when the user activates the system.

Figure 3:
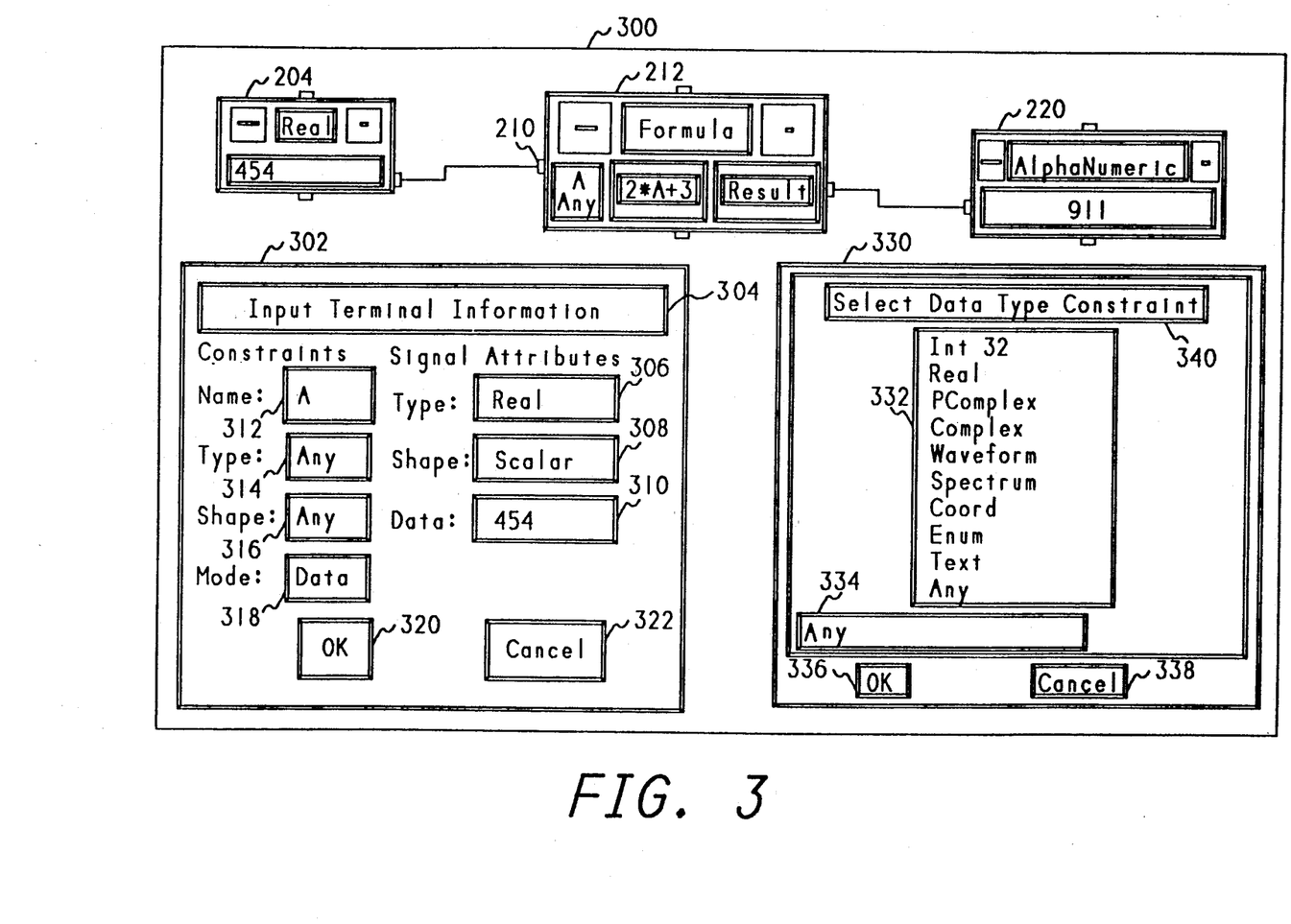
FIG. 3 shows the iconic network of FIG. 2 including a display of the data type dialog box of the present invention.

FIG. 3 shows the iconic network of FIG. 2 with the addition of the constraint dialog boxes of the present invention. Referring now to FIG. 3, the iconic network of FIG. 2 is shown including the real icon 204, the formula icon 212, and the alphanumeric icon 220. FIG. 3 illustrates the display after the user has requested a display of the constraints for the input terminal 210 of the formula icon 212. This request was performed by using the pointing device to click on a menu item (not shown) and then selecting the input terminal 210. The information about the input terminal 210 is shown in a dialog box 302. The title 304 indicates that the dialog box displays input terminal constraint information. Within the dialog box 302 are three boxes that display signal attributes for a signal that has been received by the terminal 210. Box 306 displays the data type being input to the icon 212 which, in this case, is a real number. Box 308 indicates that the shape of the data is scalar, and box 310 indicates that the value of the data is the real number "454". Within the data constraint information, box 312 displays the name of the input terminal, in this case the single letter "A". As also illustrated in FIG. 2, the name of the terminal was used in the formula in box 213. Box 314 illustrates that the type of data that this terminal will accept is any type. Box 316 shows that the shape of the data that this terminal will accept is any shape, and box 318 indicates that this is a data mode terminal, as opposed to a control mode terminal. Box 320 is used by the user of the system when they wish to terminate the display of the data constraint information. The cancel box 322 allows the user to cancel any changes made to the input constraint fields or the data.

The user may click the pointing device on the type box 314, to indicate that they wish to change the type constraint. When this happens, the system presents the dialog box 330 to allow the data type constraint to be changed. The dialog box 330 contains a title 340, which indicates that the dialog box is used for changing the type constraint, and a menu 332. The menu 332 provides the user with a choice for the type of data that can be accepted by the input terminal 210. The user may make a selection from the menu 332, or the user may input data into a data area 334 using the keyboard 106 (FIG. 1), to indicate the type of data. After selecting from the menu or inputting the data type into the area 334, the user clicks the pointing device on the "OK" button 336 to change the type constraint, or the user may click the pointing device on the "CANCEL" button 338 to negate the change, thus leaving the type constraint unchanged.

Figure 4:
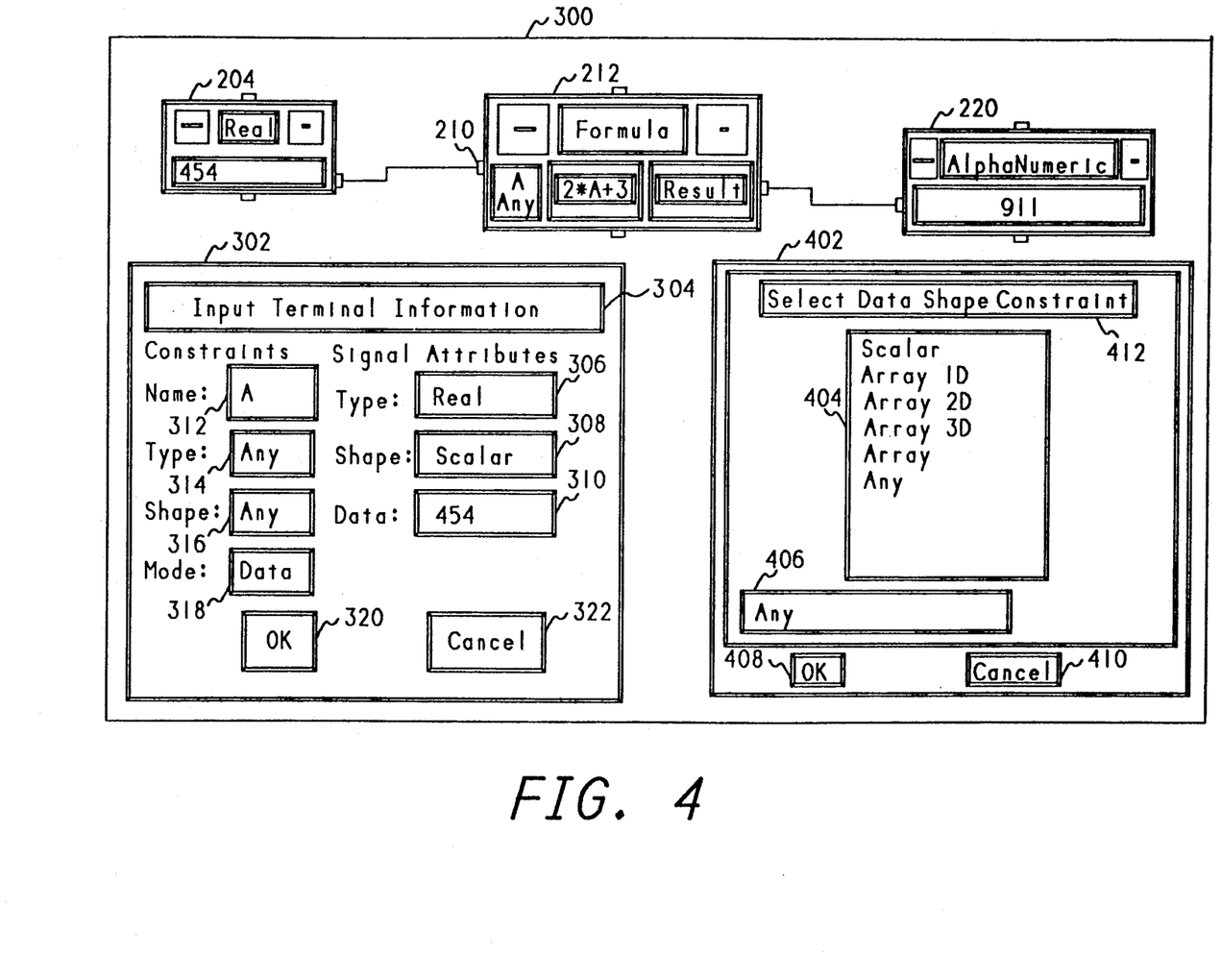
FIG. 4 shows the iconic network of FIG. 2 including a display of the data shape dialog box of the present invention.

FIG. 4 also shows the iconic network of FIG. 2 with the addition of the constraint dialog boxes of the present invention. Referring now to FIG. 4, the iconic network of FIG. 2 is shown including the real icon 204, the formula icon 212, and the alphanumeric icon 220. In FIG. 4 the user has also requested a display of the constraints for the input terminal 210 of the formula icon 212. The information about the input terminal 210 is shown in a dialog box 302, which is identical to the dialog box 302 of FIG. 3.

In FIG. 4, the user clicked the pointing device on the shape box 316, indicating that they wished to change the shape constraint. This caused the system to present the dialog box 402 to allow the shape constraint to be changed. The dialog box 402 contains a title 412, which indicates that the dialog box is used for changing the shape constraint, and a menu 404. The menu 404 provides the user with a choice for the shape of data that can be accepted by the input terminal 210. The user may make a selection from the menu 404 or the user may input data into a data area 406 to indicate the shape of data. After selecting from the menu or inputting the data shape into the area 406, the user clicks the pointing device on the "OK" button 408 to change the type constraint, or the user may click the pointing device on the "CANCEL" button 410 to negate the change, thus leaving the type constraint unchanged.

Figure 5:
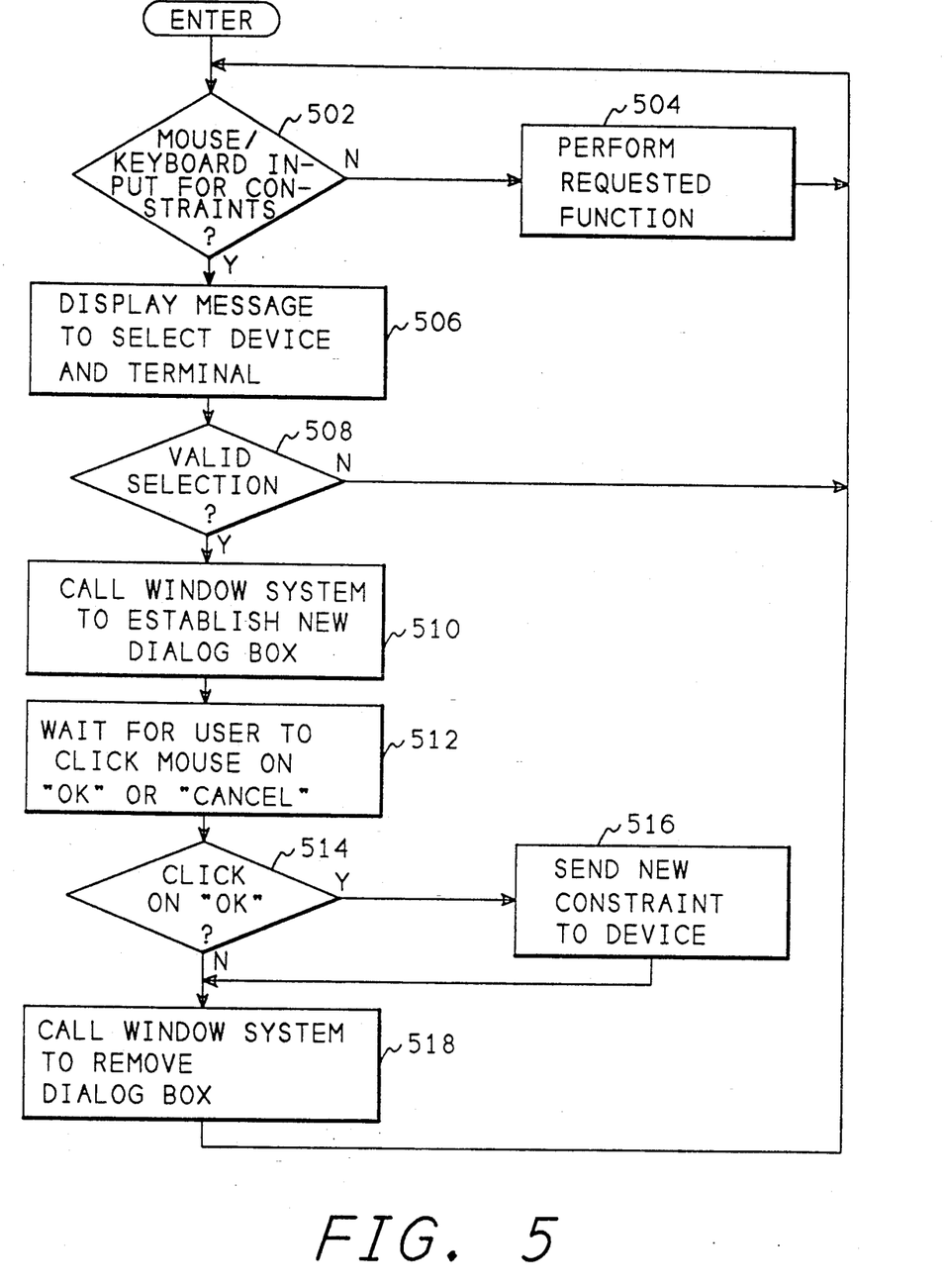
FIG. 5 shows a flowchart of the dialog box display method of the present invention.
Figure 6:
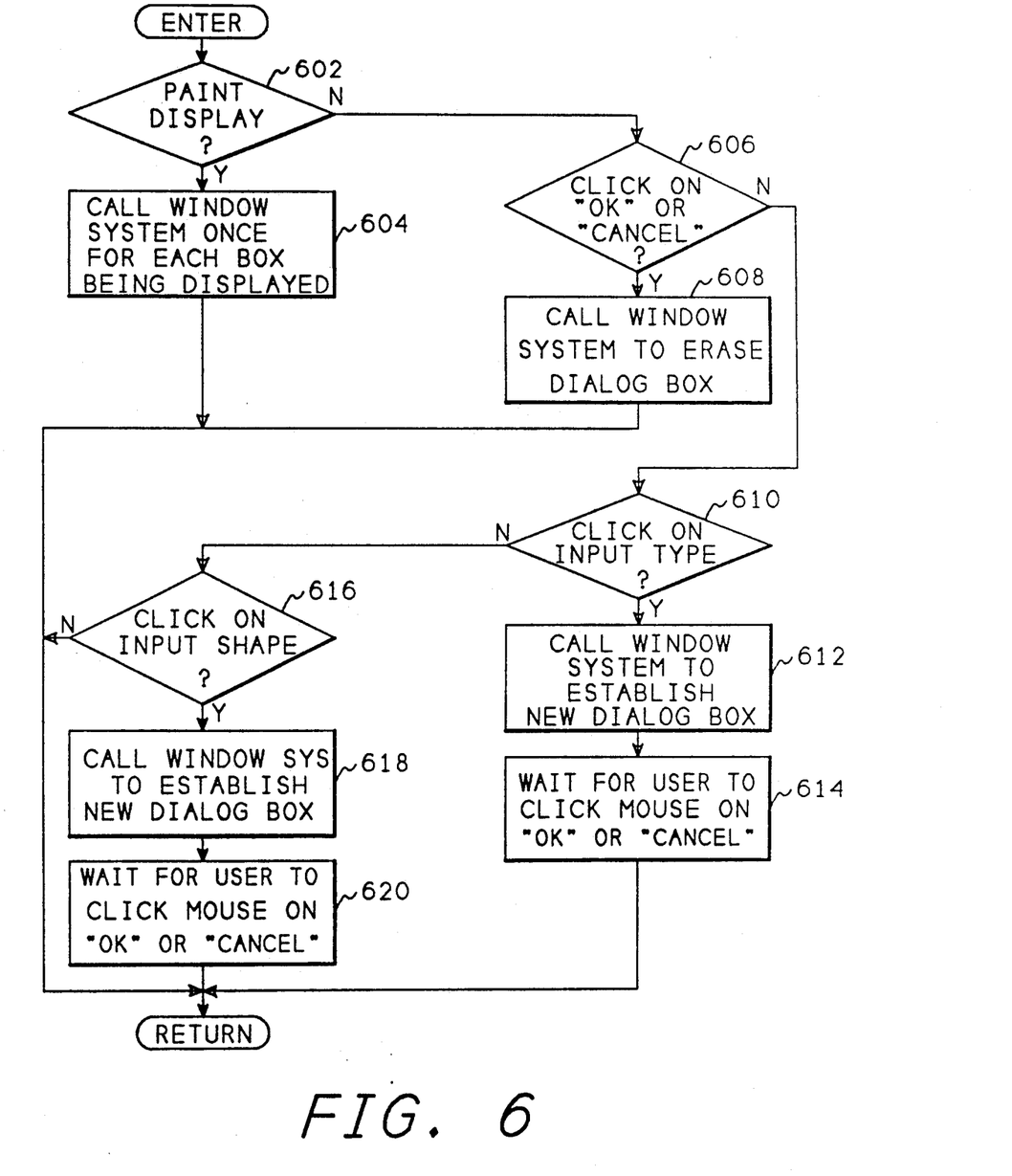
FIG. 6 shows a flowchart of the data constraint dialog display routine called from the windowing system.

FIGS. 5 and 6 show a flow chart of the method of displaying the dialog boxes 302, 330, and 402 (FIGS. 3 and 4). The system of the present invention operates in a windows environment, such as the X window system of the Unix operating system, or the Microsoft Windows System under the MS DOS operating system. Unix is a trademark of AT&T, and Microsoft Windows is a trademark of Microsoft Corporation. The flow chart of FIG. 5 will be called by the iconic programming system whenever the user uses the pointing device to click on an input terminal of an icon. For example, the dialog box 302 of FIG. 3 was displayed when the user clicked the pointing device on input terminal 210. Referring now to FIG. 5, when the user clicks the pointing device on the input terminal the flow chart will be entered. After entry, block 502 determines whether the pointing device or keyboard input is for a display of input constraints. If the user clicks on some other feature of the iconic network, the pointing device or keyboard input will not be for a display of constraints so block 502 transfers to block 504 which performs the other requested function. If the pointing device has been clicked on an input terminal, block 502 transfers to block 506 which displays a message asking the user to click on the particular terminal. Block 508 then determines whether the user has clicked on a valid input terminal and if not, goes back to 502 to await additional pointing device or keyboard input. If the user has clicked the pointing device on a valid input terminal, block 508 transfers to block 510 which calls the windowing system to establish a new dialog box in order to display the input terminal information, such as the information illustrated in dialog box 302. In establishing this new dialog box, the iconic programming system indicates to the windowing system that FIG. 6 is to be called to display the contents of the dialog box and to accept input from the user. Therefore, after calling the windowing system, block 510 transfers to block 512 which simply waits for the windowing system and the flow chart of FIG. 6 to perform its function. After the user has exited the flowchart of FIG. 6, control will return to block 512, and it will transfer to block 514 which determines whether the user, after inputting any data, clicked on the "OK" button within the dialog box. If the user did click on the "OK" button, block 514 transfers to block 516 which sends the new data constraints input by the user to the icon, where they are stored. After sending these constraints to the device, or if the user clicked on the "CANCEL" button, control goes to block 518 which calls the window system to remove the dialog box and then returns to block 502 to await additional pointing device or keyboard input.

FIG. 6 shows a flow chart of the routine that will be called by the window system to display the dialog box on the screen or to accept input into the dialog box. The call to FIG. 6 was set up by block 510 of FIG. 5 when it established the new dialog box. When the window system calls FIG. 6, after entry, block 602 determines whether the call is to request a display of the dialog box. If the call is a display request, block 602 transfers to block 604 which repeatedly calls the window system to display each of the boxes within the dialog box 302 (FIG. 3). That is, the window system will be called to display the title 304, the signal attributes type 306, etc. After the window system has been called to display each of the dialog boxes, block 604 returns to the window system.

If the call from the window system is for accepting user input, block 602 transfers to block 606 which determines whether the user has clicked the pointing device on the "OK" button 320 or the "CANCEL" button 322. If either of these buttons have been clicked, control transfers to block 608 which calls the window system to erase the dialog box before returning.

If the user has not clicked either of these buttons, block 606 transfers to block 610 which determines whether the user has clicked on the input constraints type box 314. If the user has clicked this box, block 610 transfers to block 612 which calls the window system to establish a new dialog box to display the data type constraint dialog box 330 (FIG. 3). After calling the window system to establish this dialog box, control transfers to block 614 where the system waits for the processing of FIG. 7. After the user has clicked the pointing device on "OK" or "CANCEL" in FIG. 7, control returns to block 614 which sets a flag indicating that processing is complete and then returns to the window system.

If the user has not clicked on the input type box, block 610 transfers to block 616 which determines whether the user has clicked the pointing device on the input shape box. If the user has not clicked the pointing device on the input shape, box 616 simply returns to the window system to ignore the user input. If the user did click the pointing device on the shape box 316 (FIG. 3), block 616 transfers to block 618 which calls the window system to establish a new dialog box to display the data shape constraint dialog box 402 (FIG. 4). Control then goes to block 620 which waits for the user to complete processing of FIG. 7. After the user has completed processing of the data shape constraint dialog box, FIG. 6 sets a flag indicating that processing is complete before returning to the window system.

Figure 7:
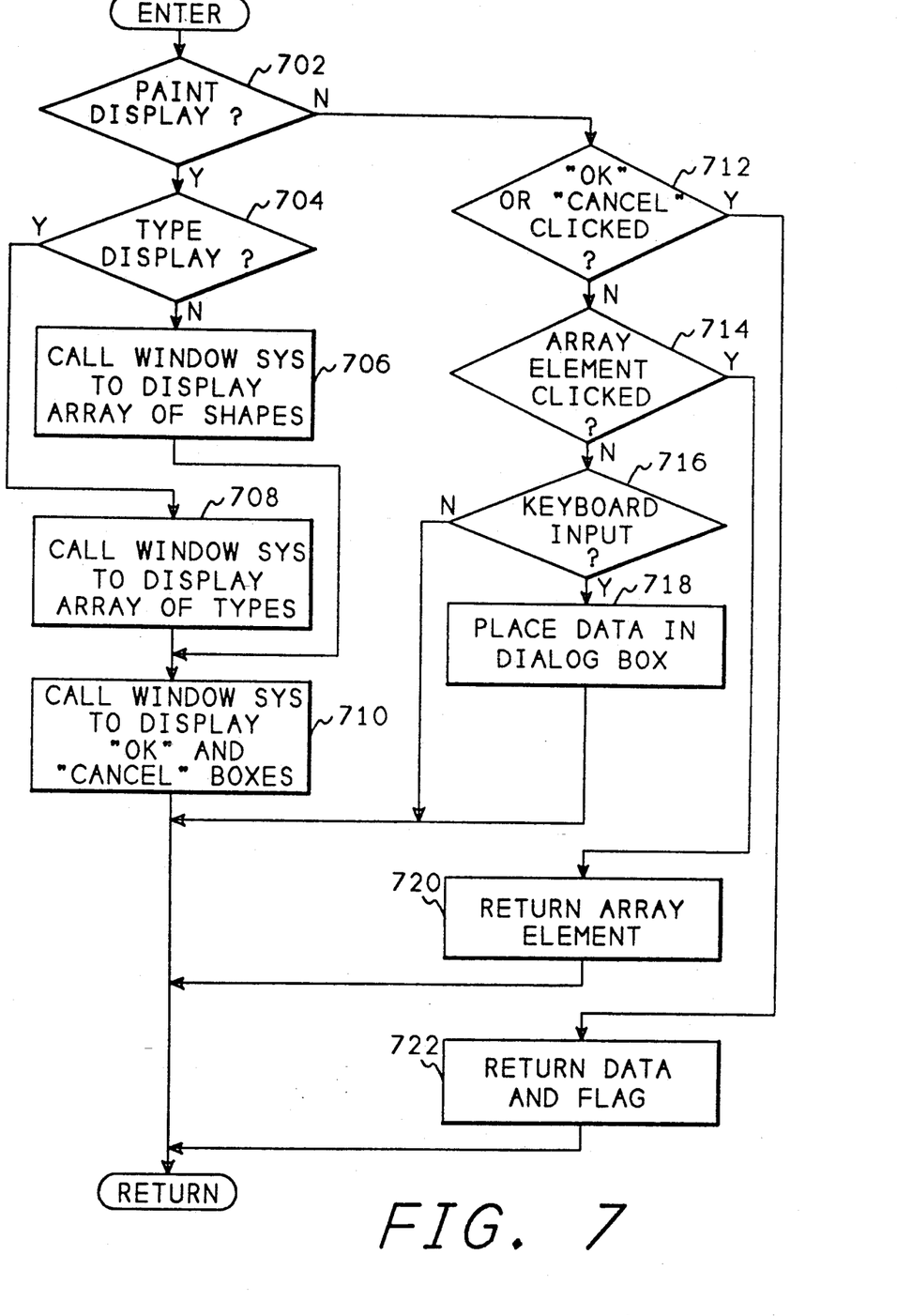
FIG. 7 shows a flowchart of the data type and shape display routine called from the windowing system.

FIG. 7 shows a flow chart of the process of displaying either the type dialog box 330 of FIG. 3 or the shape dialog box 402 of FIG. 4. Referring now to FIG. 7, after entry, block 702 determines whether the call to this FIG. is for painting the dialog box on the display. If the call is for painting, block 702 transfers to block 704 which determines whether the call is for a type dialog box 330 of FIG. 3 or the shape dialog box 402 of FIG. 4. If the display to be painted is the type dialog box, block 704 transfers to block 708 which calls the window system to display the dialog box 330, title box 340 and the array box 332 (FIG. 3) showing the data types available to the user. Block 710 then calls the window system to display the "OK" box 336 and the "CANCEL" box 338 (FIG. 3). After displaying these boxes, block 710 returns to the windowing system. If the display is for the shape dialog box 402 of FIG. 4, block 704 transfers to block 706 which calls the window system to display the dialog box 402, title box 412, and the array box 404 showing the shapes available to the user. Block 706 then transfers to block 710 which displays the "OK" and "CANCEL" boxes before returning to the window system.

If the call to FIG. 7 is for user input, block 702 transfers to block 712 which determines whether the user has clicked the "OK" or "CANCEL" buttons. If the user has clicked "OK" or "CANCEL", block 712 transfers to block 722 which returns any data previously input by the user and a flag to the windowing system indicating that the user input is complete and the dialog box should be removed from the display. If the user has not clicked the "OK" or "CANCEL" buttons, block 712 transfers to block 714 which determines whether the user has clicked one of the array elements. If the user has clicked one of the array elements block 714 transfers to block 720 which places the content of the array element into the text input area, that is, area 334 of FIG. 3, or area 406 of FIG. 4, depending upon which dialog box is being displayed. After placing the data from the array element into the text input area, block 720 returns to the windowing system. If the user has not selected an array element, block 714 transfers to block 716 which determines whether the user has typed a keyboard character. If the user has not entered data from the keyboard, block 716 returns to the window system to ignore the user input. If the user has typed an input character, block 716 transfers to block 718 which places the user data into the text input area 334 or the text input area 406, depending upon which dialog box is being displayed. Block 718 then returns to the windowing system to await additional input.

Figure 8:
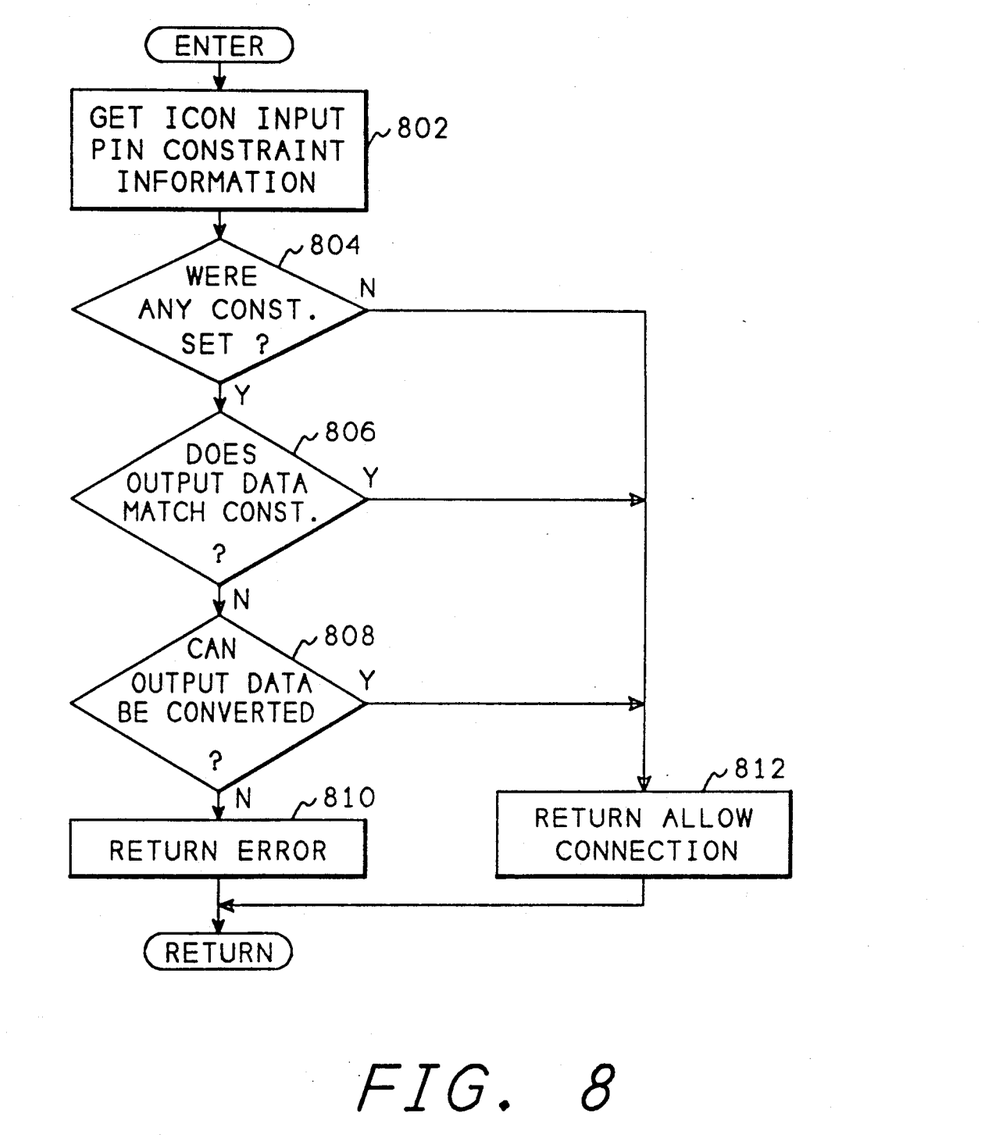
FIG. 8 shows a flowchart of the constraint check routine called when a line is being connected between two icons within an iconic network.

FIG. 8 shows a flow chart of the constraint check routine which is called by the iconic programming system whenever a line is being connected between two icons within an iconic network. Referring now to FIG. 8, after entry, block 802 gets the icon input terminal constraint information for the terminal of the icon that will receive data. Block 804 then determines whether any input constraints have been set by the user on this input terminal. If no input constraints have been set, block 804 transfers to block 812 which returns a flag to the iconic programming system indicating that the connection should be allowed. If some input constraints have been set, block 804 transfers to block 806 which determines whether the output data from the icon connected to the line matches the constraints that have been set. If the output data does match the constraints, block 806 transfers to block 812 to allow the line to be connected. If the output data does not match the output constraints, block 806 transfers to block 808 which determines whether the output data can be converted to data that would be acceptable to the constraints. For example, if the output data is an integer, and the input constraints call for a real number, an integer can be converted to a real number so the conversion is possible. If data conversion is possible, block 808 transfers to block 812 to allow the line connection. If conversion is not possible, block 808 transfers to block 810 which returns an error flag to the iconic programming system to prevent the line connection.

Figure 9:
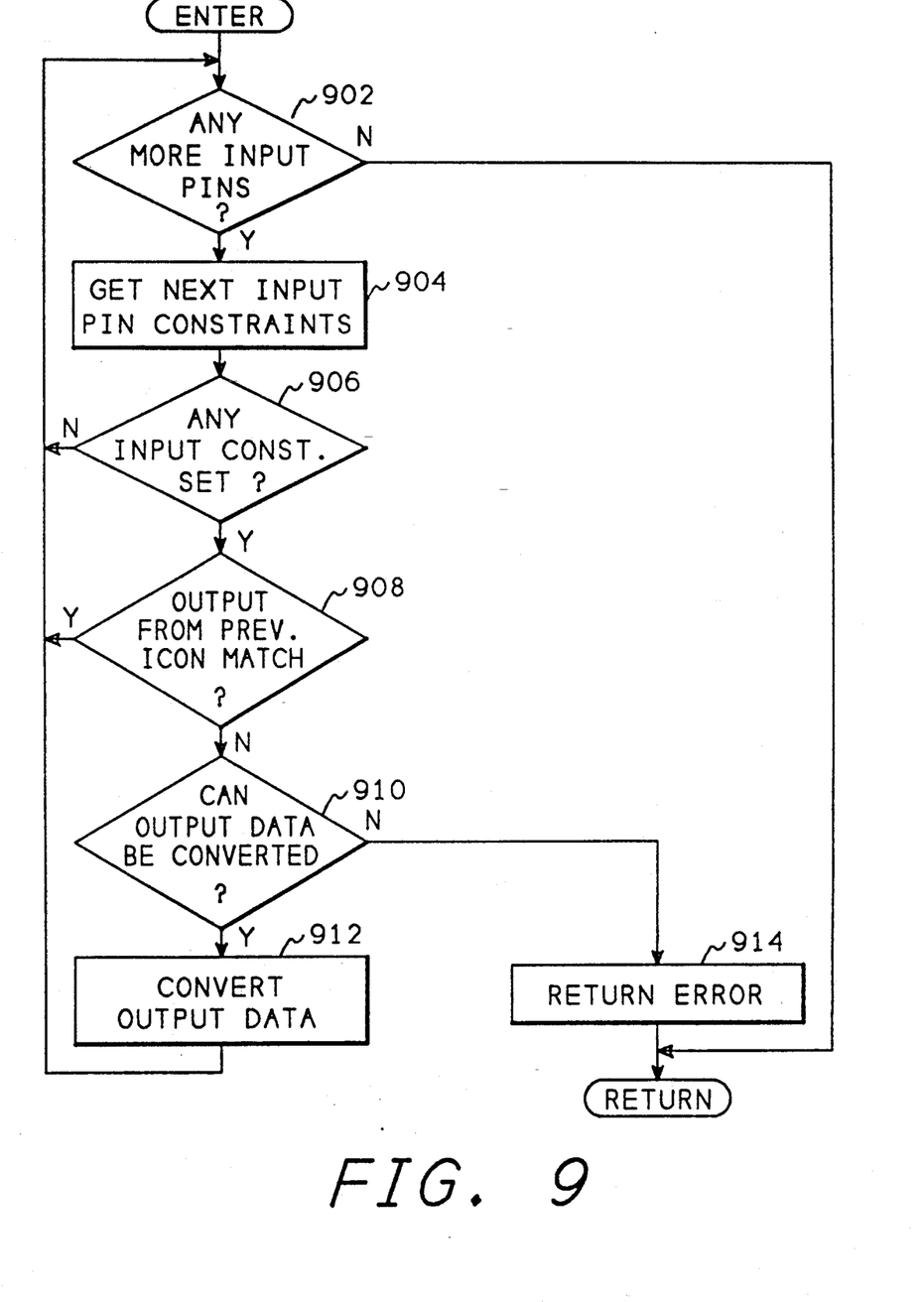
FIG. 9 shows a flowchart of the run time constraint check routine called when the functions of an icon are about to be performed.

FIG. 9 shows a flow chart of the run time constraint check routine which is called during execution of the iconic network when the functions of an icon are about to be performed. The flow chart of FIG. 9 will determine whether the data available on the input terminals of the icon can be processed by the icon. Referring now to FIG. 9, after entry, block 902 determines whether any input terminals need to be checked. If at least one input terminal does need to be checked, block 902 transfers to block 904 which gets the input constraints from the next input terminal. Block 906 then determines whether any input constraints have been set for this pin, and if not, block 906 transfers back to block 902 to check the next input pin. If some input constraints have been set for this pin, block 906 transfers to block 908 which determines whether the output from the previous icon matches the input constraints. If the output from the previous icon does match the input constraints, block 908 transfers back to block 902 to check the next input terminal. If the output does not match the constraints, block 908 transfers to block 910 which determines whether the output data can be converted. If the output data can be converted, block 910 transfers to block 912 which calls a routine to perform the data conversion before returning to block 902 to check the next input terminal. If the data cannot be converted, block 910 transfers to block 914 which returns an error to discontinue processing of the iconic network. After all input terminals have been checked, block 902 returns to the iconic programming network to allow processing of the icon.

In the manner described above for type and shape, the system also allows a programmer to constrain the size and limits of the data. For example the data size may be specified to require that an array be at least ten elements long. Also the data may be limited, for example, the value of a scalar might be limited to be within 1 and 100.

The system also provides a facility to allow the programmer that creates the iconic network and therefore specifies the input data constraints to lock the constraints to prevent later changes. This prevents an operator of the system from changing the constraints when the system is used.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In an iconic programming system process within a computer system, a method for constraining a form of data acceptable as input to each terminal of an icon of said process, said method comprising the steps of:
   (a) accepting a display request for data form constraint information for a terminal of said icon from a user of said process;
   (b) programmatically obtaining data form constraint information for said terminal of said icon requested in step (a);
   (c) displaying said data form constraint information in a display window of said iconic programming system process;
   (d) accepting any data form constraint modification input data from the user of said process;
   (e) modifying said data form constraining information using said data form constraint modification input data;
   (f) before processing an icon, determining if a form of data being input to each input terminal of said icon matches data form constraints defined by data form constraint information for said input terminal; and
   (g) stopping said processing when said data form constraints do not match.

2. The method of claim 1 wherein step (f) further comprises the steps of:
   (f1) if said form of said data being input does not match said data form constraints, converting said data to a form that matches said data form constraints; and
   (f2) stopping said processing when said data cannot be converted to a matching form.

3. The method of claim 1 wherein step (e) further comprises the step of locking said modified data form constraint information whereby said constraint information may not be changed by the user.

4. A data form constraint system for constraining a form of data input to an icon of an iconic programming system, said data form constraint system comprising:
   means for accepting a display request for displaying data form constraint information for an icon terminal;
   means for obtaining data form constraint information for said icon terminal;
   means for formatting and displaying said data form constraint information in a display window of said iconic programming system;
   means for accepting any data form constraint modification input data;
   means for modifying said data form constraint information with said data form constraint modification input data;
   during connecting of a line between an output terminal of a first icon to an input terminal of a second icon, means for determining if the data form of data to be output by said output terminal matches data form constraints for said input terminals; and
   means for preventing said connecting when said data form constraints do not match said data form constraints for said input terminal.

5. The constraint system of claim 4 wherein said means for determining further comprises:
   means for defining a conversion method to convert a form of data to be output on said output terminal to a form that matches said data form constraints for said input terminal; and
   means for preventing said connecting when said data to be outputted cannot be converted to a form that matches said data form constraints for said input terminal.

6. The constraint system of claim 4 wherein said means for modifying said data form constraint information further comprises means for locking said modification.

7. In an iconic programming system process within a computer system, a method for constraining a form of data acceptable as input to each terminal of an icon of said process, during a connection of icons while creating said process, said method comprising the steps of:
   (a) accepting a display request for data form constraint information of a terminal of said icon from a user of said process;
   (b) programmatically obtaining data form constraint information for said terminal of said icon requested in step (a);
   (c) displaying said data form constraint information in a display window of said iconic programming system process;
   (d) accepting any data form constraint modification input data from the user of said process;
   (e) modifying said data form constraining information using said data form constraint modification input data and locking said modification to prevent additional modification;
   (f) before connecting a line between an output terminal of a first icon to an input terminal of a second icon, determining if the data form to be output by said output terminal matches data form constraints for said input terminal; and
   (g) preventing said connecting in step (f) when said data form constraints do not match.

8. The method of claim 7 wherein step (f) further comprises the steps of:
   (f1) if said data to be output on said output terminal does not match said data form constraints for said input terminal, defining a conversion method to convert said output terminal data to a data form that matches said input terminal data form constraints; and
   (f2) preventing said connecting when no data conversion method is available.

* * * * *